(12) United States Patent
Levent-Levi et al.

(10) Patent No.: US 7,464,167 B2
(45) Date of Patent: Dec. 9, 2008

(54) METHOD FOR REDUCING CALL SET UP TIMES USING AUTOMATIC CONNECTION NEGOTIATION

(75) Inventors: Tsahi Levent-Levi, Givat Shmuel (IL); Oren Libis, Ramat-Hasharon (IL); Alexander Ruditsky, Fair Lawn, NJ (US)

(73) Assignee: Radvision Ltd., Tel Aviv (IL)

( * ) Notice: Subject to any disclaimer, the term of this patent is extended or adjusted under 35 U.S.C. 154(b) by 251 days.

(21) Appl. No.: 11/400,626

(22) Filed: Apr. 7, 2006

(65) Prior Publication Data

US 2007/0078998 A1    Apr. 5, 2007

Related U.S. Application Data

(60) Provisional application No. 60/678,492, filed on May 6, 2005.

(51) Int. Cl.
    *G06F 13/00* (2006.01)
(52) U.S. Cl. ...................................... 709/228
(58) Field of Classification Search .................. 709/228
    See application file for complete search history.

(56) References Cited

U.S. PATENT DOCUMENTS

| | | | |
|---|---|---|---|
| 6,810,035 B1 * | 10/2004 | Knuutila et al. ............. | 370/354 |
| 2002/0085517 A1 * | 7/2002 | Lee et al. .................... | 370/331 |
| 2004/0064762 A1 * | 4/2004 | Deshpande et al. ........... | 714/44 |
| 2004/0174817 A1 * | 9/2004 | Jabri et al. ................... | 370/238 |
| 2006/0029041 A1 * | 2/2006 | Jabri et al. ................... | 370/352 |
| 2006/0159037 A1 * | 7/2006 | Jabri et al. ................... | 370/310 |
| 2006/0174015 A1 * | 8/2006 | Arauz-Rosado ............. | 709/228 |

OTHER PUBLICATIONS

International Search Report and the Written Opinion of the International Searching Authority, International Patent Application No. PCT/US06/17318, Mar. 24, 2008.

* cited by examiner

*Primary Examiner*—Robert B Harrell
(74) *Attorney, Agent, or Firm*—Byrne Poh LLP

(57) ABSTRACT

Methods and products for reducing the time required to set-up a call are provided. In particular, new functionality to H.324 is added by allowing the transmission of media to commence after a reduced number of H.245 messages have been exchanged by two calling devices. If two terminals involved in a call are capable of automatic connect renegotiation, one or more predetermined logical channels in the two terminals for transmitting media is selected, a message is sent from one terminal to the other terminal to open the predetermined logical channel, and media transmission between the two terminals is commenced.

27 Claims, 9 Drawing Sheets

METHOD FOR REDUCING CALL SET UP TIMES USING AUTOMATIC CONNECTION NEGOTIATION

CROSS-REFERENCE TO RELATED APPLICATIONS

The present application claims the benefit of U.S. Provisional Patent Application No. 60/678,492, filed May 6, 2005, which is hereby incorporated by reference herein in its entirety.

FIELD OF THE INVENTION

The present invention relates to methods and products for improving call set-up time in third generation (3G) terminals such as mobile telephones, servers, and the like. More particularly, the present invention relates to adding new functionality to the H.324 protocol for setting up channels for media delivery in 3G video telephony to allow for faster call set-up times.

BACKGROUND OF THE INVENTION

ITU H.324 Recommendation, which is hereby incorporated by reference herein in its entirety, dictates the protocol that is used with 3G terminals in setting up media channels for media transmission. As part of this protocol, messages specified in ITU H.245 Recommendation, which is hereby incorporated by reference herein in its entirety, are exchanged between a local terminal and a remote terminal.

One problem with H.324 is that call set-up is a long process mainly due to a series of H.245 messages that are exchanged by two terminals. Today, to open a call with an audio and a video channel, usually ten or more H.245 messages need to be exchanged. This requires three to ten round trips of messages. Even more messages may be required to handle channel conflicts or overcome noisy communication lines.

Turning to FIG. 1, a simplified block diagram of two terminals communicating via a conventional network is shown. As illustrated, a local terminal 11 communicates with a remote terminal 12 via a network 13. Local terminal 11 and remote terminal 12 may be for example, devices for engaging in 3G communications, and may be wired or wireless devices, such as 3G mobile telephones, servers, etc. Network 13 may be any kind of circuit switched network, or any other network that may be used to pass H.324 data. For example, network 13 may be a network supporting 3G connections such as an Integrated Services Digital Network (ISDN), a Public Switched Telephone Network (PSTN), a Transmission Control Protocol (TCP) network, and the like.

FIGS. 2A and 2B illustrate an example of how terminals 11 and 12 may set up a call using a conventional H.324 protocol. As shown, at step 21, an H.245 TerminalCapabilitySet request (TCS) message and an H.245 MasterSlaveDetermination request (MSD) message are sent from each terminal and received by the other. The TCS messages indicate the respective capabilities of terminals 11 and 12, such as supported audio and video codecs, supported features and services, supported adaptation layers, and so on. The MSD messages determine the master/slave relationship of terminals 11 and 12.

Subsequently, at step 22, each terminal acknowledges the other's TCS and MSD messages by sending an H.245 TerminalCapabilitySetAck response (TCS Ack) message and an H.245 MasterSlaveDeterminationAck response (MSD Ack) message. At this point, both terminals recognize the type of codecs they can use and which of terminals 11 and 12 is the master or the slave of this call.

Next, at step 23, H.245 OpenLogicalChannel request (OLC) messages are sent and received by terminals 11 and 12. Generally, a single video channel and a single audio channel are opened.

H.245 OpenLogicalChannelAck response (OLC Ack) messages, acknowledging the receipt of OLC messages, are then sent and received at step 24. Sometimes, H.245 OpenLogicalChannelReject response (OLC Reject) messages are sent, which might require additional messages to resolve the situation to be sent.

At step 25, H.245 MultiplexEntrySend request (MES) messages are sent and received by terminals 11 and 12 to enable an H.223 multiplexing (MUX) entry table to be exchanged. The H.223 MUX entry table allows terminals 11 and 12 to demultiplex the media sent on the opened channels.

Next, at step 26, H.245 MultiplexEntrySendAck response (MES Ack) messages are then sent and received by terminals 11 and 12 to acknowledge the MES message received from the other terminal.

Finally, after this entire exchange of messages, media is sent and received at step 27.

As can be seen, the conventional method requires that at least ten messages be handled by each terminal before media is sent or received. Such a large number of messages introduces a large delay to the call set-up process. Hence, a method for speeding up the call set-up process may be desirable and may offer many significant advantages over the currently utilized call set-up methods. The above illustrates the "best-case" scenario, where all goes well. In cases of problems, retransmissions or additional messages might be required.

SUMMARY OF THE INVENTION

The present invention provides methods and products to reduce the time required to set-up a call without reducing the number of H.245 messages that are sent or their normal procedures. In particular, the present invention adds new functionality to H.324 by allowing the transmission of media to commence after a reduced number of H.245 messages have been exchanged by two calling devices.

In some embodiments, the present invention also provides methods and products for setting-up a call that includes (a) selecting a default multiplexing entry table, (b) sending a TerminalCapabilitySetAck (TCS Ack) message to a receiving terminal, (c) sending a MasterSlaveDeterminationAck (MSD Ack) message to the receiving terminal, (d) sending an OpenLogicalChannel (OLC) message to the receiving terminal, (e) sending media to the receiving terminal using one or more predetermined multiplex entries, and (f) sending a MultiplexEntrySend request (MES) message to the receiving terminal, wherein steps (a) through (e) are carried out concurrently and without waiting for acknowledgements on any of them.

In some embodiments, the present invention also provides methods and products for setting-up a call that includes (a) selecting a default multiplexing entry table, (b) receiving media from a sending terminal using one or more predetermined logical channels, (c) optionally buffering the media received in step (b), (d) presenting the media, (e) receiving a TerminalCapabilitySetAck (TCS Ack) message from the sending terminal, (f) receiving a MasterSlaveDeterminationAck (MSD Ack) message from the sending terminal, (g) receiving a OpenLogicalChannel (OLC) message from the sending terminal, and (h) receiving a MultiplexEntrySend request (MES) message from the sending terminal, wherein steps (a) through (c) are carried out before or concurrently with at least one of steps (e) through (h).

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
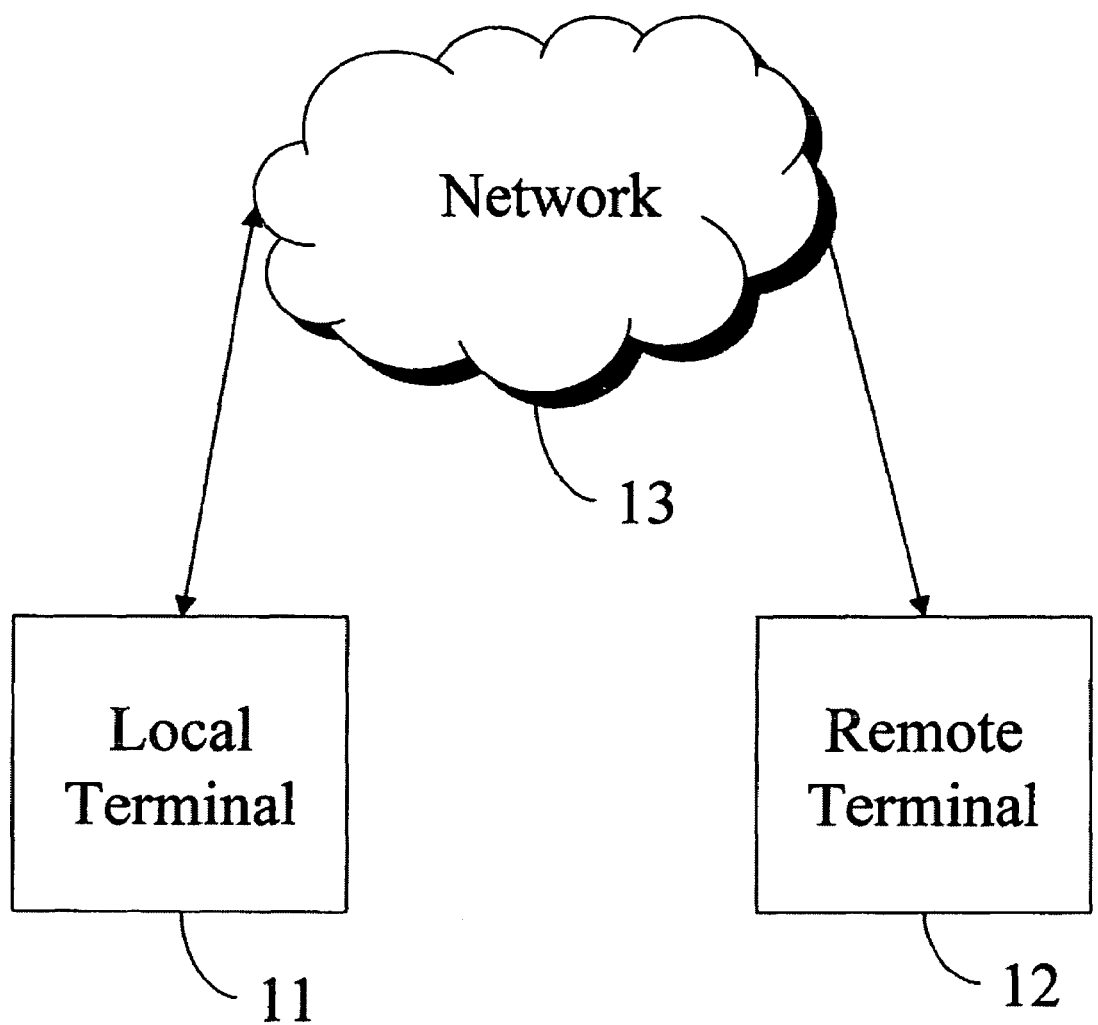
FIG. 1 is a simplified block diagram of two terminals communicating via a network in conventional systems.
Figure 2A:
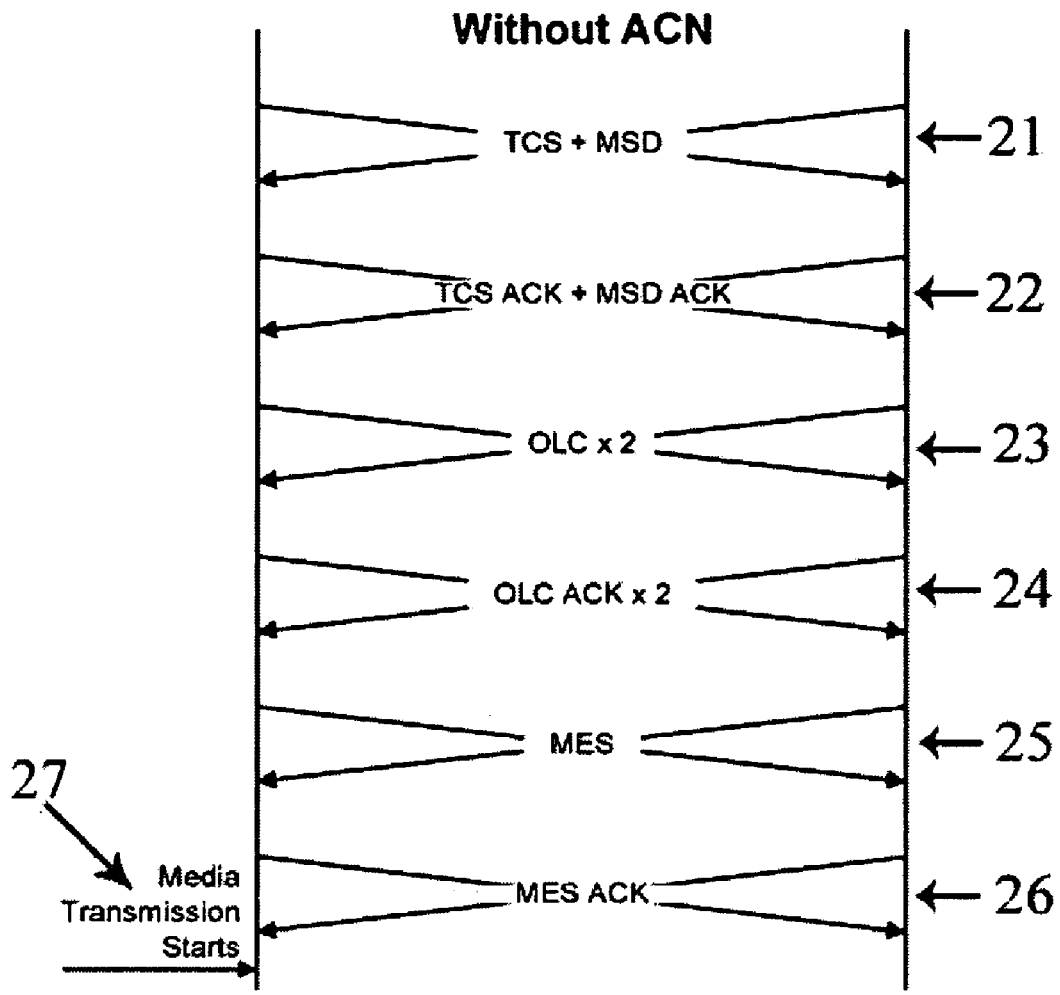
FIGS. 2A and 2B illustrate an example of how two terminals may set-up a call using a conventional H.324 protocol.
Figure 2B:
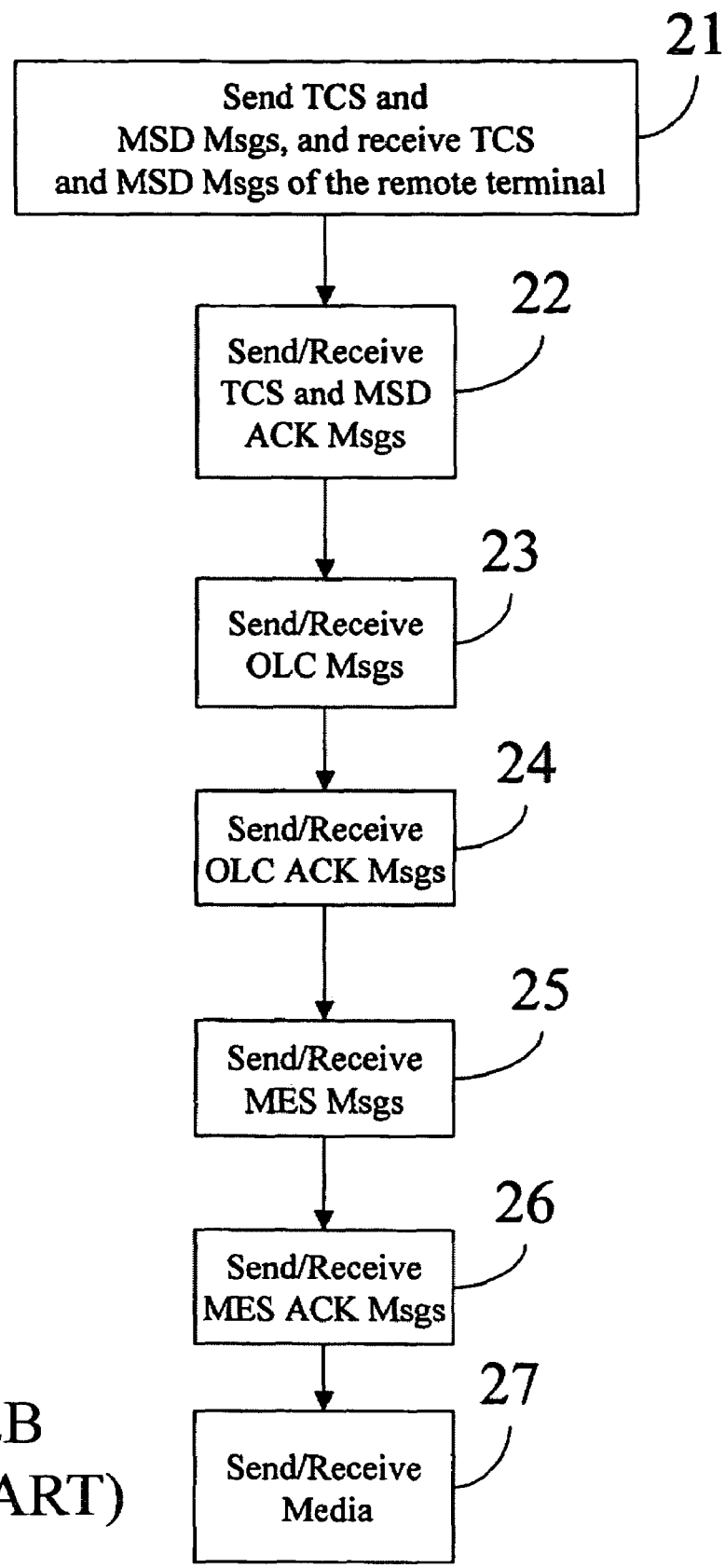

Methods and products in accordance with the present invention allow transmission of media considerably sooner than any currently utilized conventional implementations, such as that shown in FIGS. 2A and 2B. Methods and products in accordance with the present invention may advantageously transmit the conventional H.245 messages and the message exchange may be handled in the same manner as the currently utilized conventional protocols (e.g., as shown in FIGS. 2A and 2B), with a few minor differences.

For example, ITU H.324 Recommendation may be modified to incorporate Annex J (as shown in Tables 1 and 2) along with the acnCapability Capability definition below (as shown in Tables 3 through 5).

Annex J

ASN.1 OIDs Defined in this Recommendation

TABLE 1

| OID | Clause reference |
| --- | --- |
| { itu-t(0) recommendation(0) h(8) 324 generic-capabilities(1) SessionResetCapability(1) } | 7.7.1 |
| { itu-t(0) recommendation(0) h(8) 324 generic-capabilities(1) acnCapability(2) } | TBD |

TABLE 2

| Capability name | SessionResetCapability |
| --- | --- |
| Capability identifier type | Standard |
| Capability identifier value | { itu-t(0) recommendation(0) h(8) 324 generic-capabilities(1) SessionResetCapability(1) } |
| maxBitRate | This parameter is not used. |
| Collapsing | This field shall not be used and shall be ignored by receivers. |
| nonCollapsing | This field shall not be used and shall be ignored by receivers. |
| nonCollapsingRaw | This field shall not be used and shall be ignored by receivers. |
| Transport | This field shall not be used and shall be ignored by receivers. |

The acnCapability Capability Definition

TABLE 3 acnCapability Capability Identifier

| Capability name: | AcnCapability |
| --- | --- |
| Capability class: | Control capability. |
| Capability identifier type: | Standard. |
| Capability identifier value: | { itu-t(0) recommendation(0) h(8) 324 generic-capabilities(1) acnCapability(2) } |
| maxBitRate: | Shall not be included |
| NonCollapsingRaw: | This field shall not be included |
| transport: | This field shall not be included |

TABLE 4 acnCapability Parameter - masterBidirectionalVideo

| Parameter name: | masterBidirectionalVideo |
| --- | --- |
| Parameter description: | This is a collapsing GenericParameter. If the terminal indicating this parameter's value as 1 will be selected as the master of the call, it shall open a bidirectional video channel. In this case, the slave shall not open a video channel using the ACN procedure. If the master of the call indicates this parameter's value as 0, then the slave should open its own unidirectional channel. |
| Parameter identifier value: | 1 |
| Parameter status: | Shall be present once for capability exchange |
| Parameter type: | unsignedMax, with the value 0 or 1 |
| Supersedes: | — |

TABLE 5 acnCapability Parameter - mediaBuffering

| Parameter name: | mediaBuffering |
| --- | --- |
| Parameter description: | This is a collapsing GenericParameter. A terminal indicating this parameter's value as 1 is able to buffer the incoming media send before the relevant OLC message is received from the remote terminal, allowing faster call set-up. |
| Parameter identifier value: | 2 |
| Parameter status: | Shall be present once for capability exchange |
| Parameter type: | unsignedMin, with the value 0 or 1 |
| Supersedes: | — |

Figure 3:
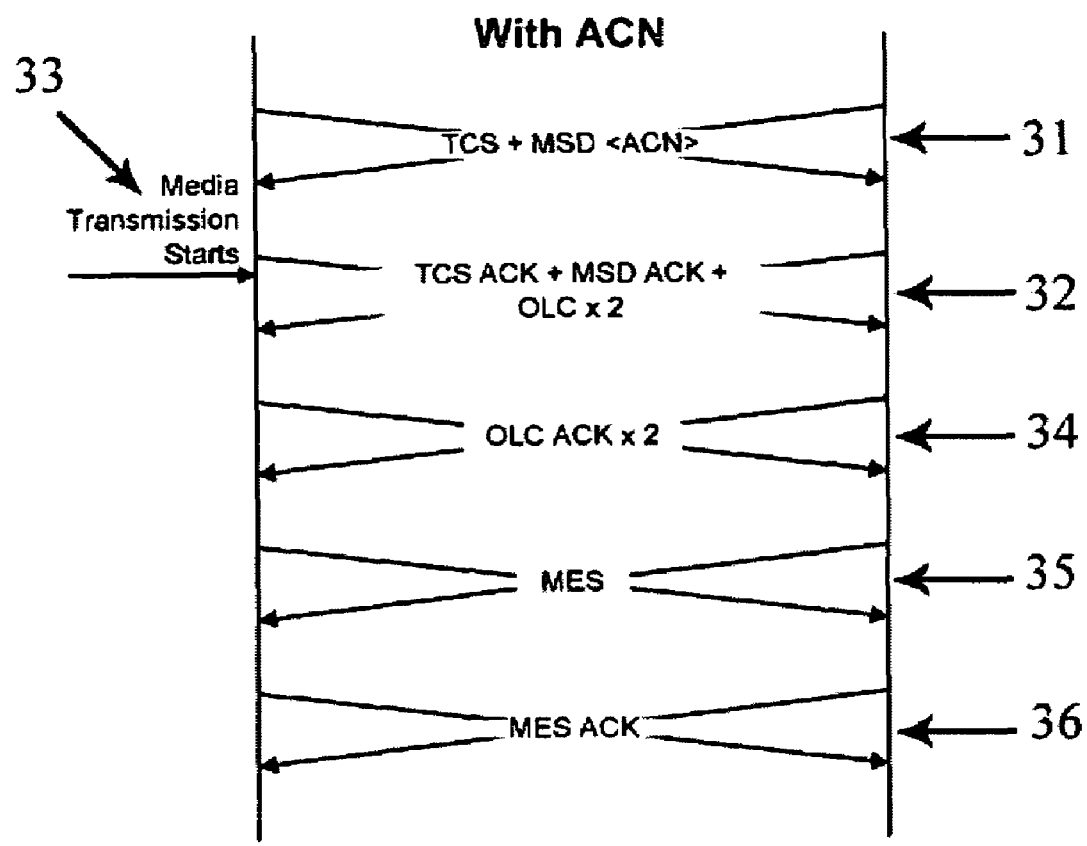
FIG. 3 is a diagram showing a method for sending and receiving media using Automatic Connection Negotiation (ACN) in accordance with certain embodiments of the present invention.

FIG. 3 generally shows how media transmission may begin at an earlier stage of a call set-up in accordance with the present invention as compared to the conventional method shown in FIGS. 2A and 2B. As illustrated, the left side of the diagram may represent a terminal 11, which initiates a call, and the right side of the diagram may represent a terminal 12, which receives a call.

At step 31, similar to step 21 of the conventional method, terminals 11 and 12 may exchange TCS and MSD messages. Unlike the conventional method, however, the TCS message may contain an indication that terminals 11 and 12 are capable of sending and receiving OLC message and media before any MSD Ack, TCS Ack, MES, and/or MES Ack messages are received. In certain embodiments, TCS messages from terminals 11 and 12 may contain an indication that terminals 11 and 12 are capable of ACN. For example, TCS messages from terminals 11 and 12 may contain an acnCapability parameter, as defined in Annex J and The acnCapability Capability Definition above, which signals support of the ACN procedure in terminals 11 and 12.

If the ACN capability is detected by terminals 11 and 12 from incoming TCS messages, terminals 11 and 12 may select the most preferred channels and send the corresponding OLC messages as shown in step 32. As shown, media transmission 33 from terminals 11 and 12 may begin concurrently with or immediately after each terminal has sent the OLC message. As shown in FIG. 3, OLC messages of each terminal may be sent along with the TCS Ack and MSD Ack messages at step 32.

Master/slave status for terminals 11 and 12 may be determined once one or both of these terminals have received the MSD message from terminals 12 and 11, respectively (see step 31). Alternatively, master/slave status may be determined once one or both of terminals 11 and 12 have received the MSD Ack message from terminals 12 and 11, respectively (see step 32).

To enable media transmission between terminals 11 and 12 on channels whose opening has not yet been acknowledged, both terminals may utilize a predetermined table, such as a predetermined table that is decided by a special signaling within the TCS message. For example, TCS message may contain an acnCapability where both terminals are instructed to utilize the following default MUX table shown in Table 6:

TABLE 6

Default MUX Table

Entry 0 shall be reserved for the control channel, for facilitating exchange of H.245 messages.
Entry 1 shall be used with a repeatCount of untilClosingFlag for the primary audio channel.
Entry 2 shall be used with a repeatCount of untilClosingFlag for the primary video channel.

The primary audio channel may be configured as a non-segmentable channel while the primary video channel may be configured as a segmentable channel. ACN may hence proceed under the assumption that the OLC and MES messages are acknowledged.

The remaining messages such as OLC Ack, MES, and MES Ack messages may be sent and processed in a conventional manner as shown in steps 34 through 36. In particular, the MES message at step 35 may send an updated MUX table that optimizes the multiplexing of the audio and video media. Therefore, if the predetermined MUX table used to initially transmit data is not optimal, subsequent transmission of the MES message may easily mitigate such problems.

In view of the description provided above, methods of the present invention may allow media transmission after only half a round trip during call set-up while maintaining full H.245 functionality as compared to at least ten messages being handled by each terminal before media is sent or received as shown in FIG. 2.

Figure 4:
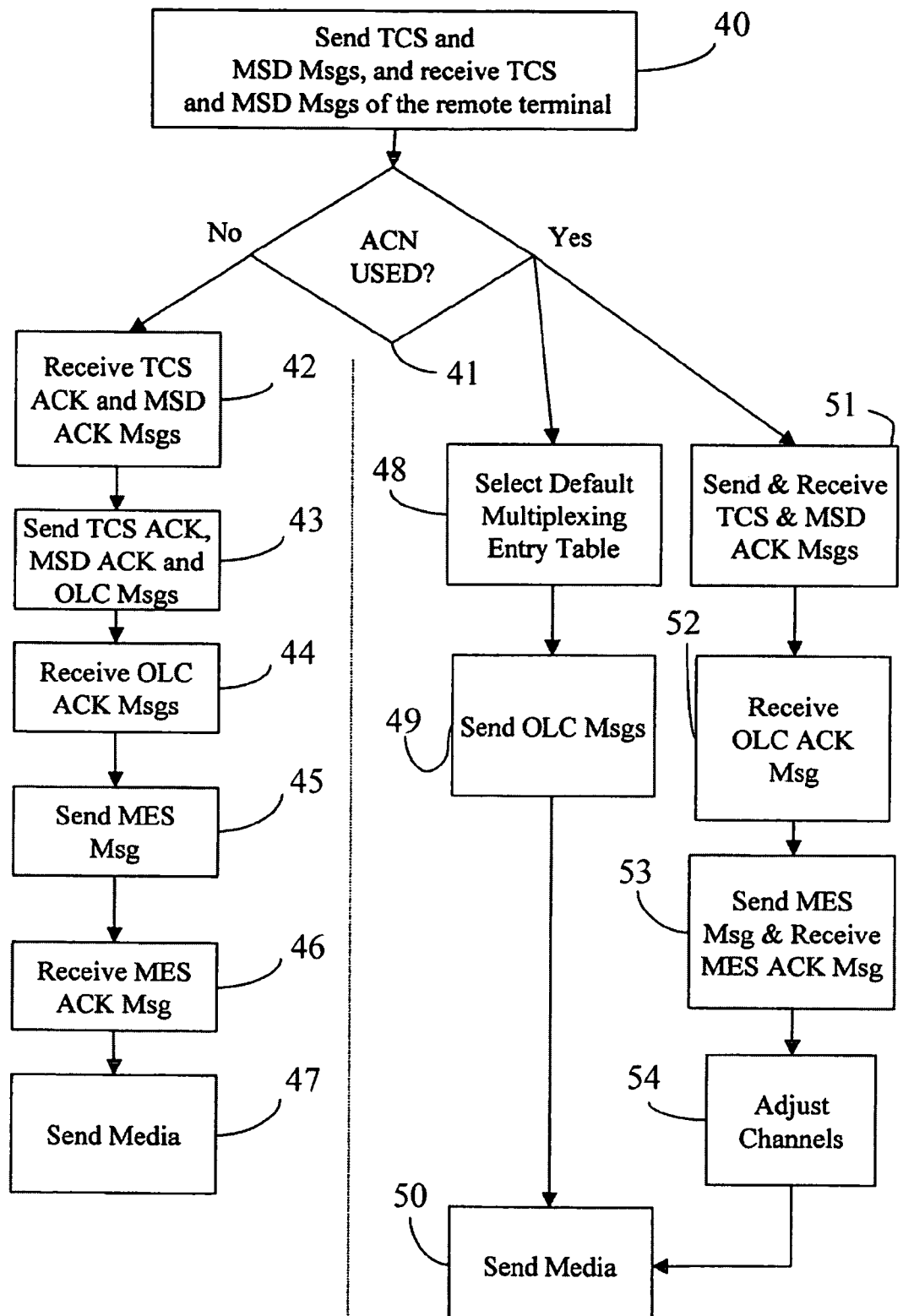
FIG. 4 is a diagram showing a method for sending media from one terminal to another terminal in accordance with certain embodiments of the present invention.

FIG. 4 illustrates a method for sending media from a terminal 11 to a terminal 12 in accordance with certain embodiments of the present invention. Either of terminals 11 or 12 may be a receiving terminal, which receives a call, and/or a sending terminal, which sends a call. Moreover, either of terminals 11 and 12 may be a local terminal or a remote terminal. However, for illustration purposes only, FIG. 4 will be described with the assumption that terminal 11 acts as a local, sending terminal (capable of ACN) and terminal 12 acts as a remote, receiving terminal.

As shown, at step 40, TCS (e.g., with an acnCapability parameter) and MSD messages may be transmitted from terminal 11 to terminal 12 and TCS (e.g., with an acnCapability parameter) and MSD messages may be transmitted from terminal 12 to terminal 11.

Next, terminal 11 may determine if ACN is going to be used at step 41. This determination may be made by determining whether terminal 12 is capable of ACN as specified in the TCS message transmitted by terminal 12, or may be made in any other suitable manner.

If it is determined that ACN is not going to be used, then the method may proceed in a conventional manner as shown in FIGS. 2A and 2B. For example, at step 42, terminal 11 may receive TCS Ack and MSD Ack messages from terminal 12. Then, at step 43, terminal 11 may send TCS Ack, MSD Ack, and OLC messages to terminal 12. Terminal 11 may then receive OLC Ack message from terminal 12 at step 44. Next, terminal 11 may send an MES message to terminal 12 at step 45 and terminal 11 may receive an MES Ack message from terminal 12 at step 46. Finally, media may be transmitted between terminals 11 and 12 at step 47, and routine transmission of media may take place after this point as is known in the art.

Returning to step 41, if it is determined that ACN is going to be used, steps 48 through 54 may be carried out. As shown, steps 48 through 50 may be performed before or concurrently with steps 51 through 54.

At step 48, a default MUX entry table may be selected. For example, the default MUX entry table may be pre-programmed into terminals 11 and 12. Then, at step 49, terminal 11 may send OLC messages to terminal 12. Although steps 48 and 49 are shown being performed in the given order, the order of the steps may be reversed in some circumstances. Next, at step 50, terminal 11 may begin sending media to terminal 12.

At step 51, terminal 11 may send TCS Ack and MSD Ack messages to terminal 12. Step 51 is usually done in parallel with step 49. Next, at step 52, terminal 11 may receive an OLC Ack message from terminal 12. Then, at step 53, an MES message may be sent from terminal 11 to terminal 12, and an MES Ack message may be received by terminal 11 from terminal 12. If necessary, at step 54, the channel selections may be adjusted as indicated in the MES message. Finally, media may be sent to terminal 12 at step 50, as known in the art.

As can be seen, when ACN is used, media may be sent much more quickly than that possible using conventional methods leading to a substantial decrease in waiting time for call set-up. By sending media before or concurrently with performing steps 51 through 54, much of the delay of setting up a call can be eliminated.

Figure 5:
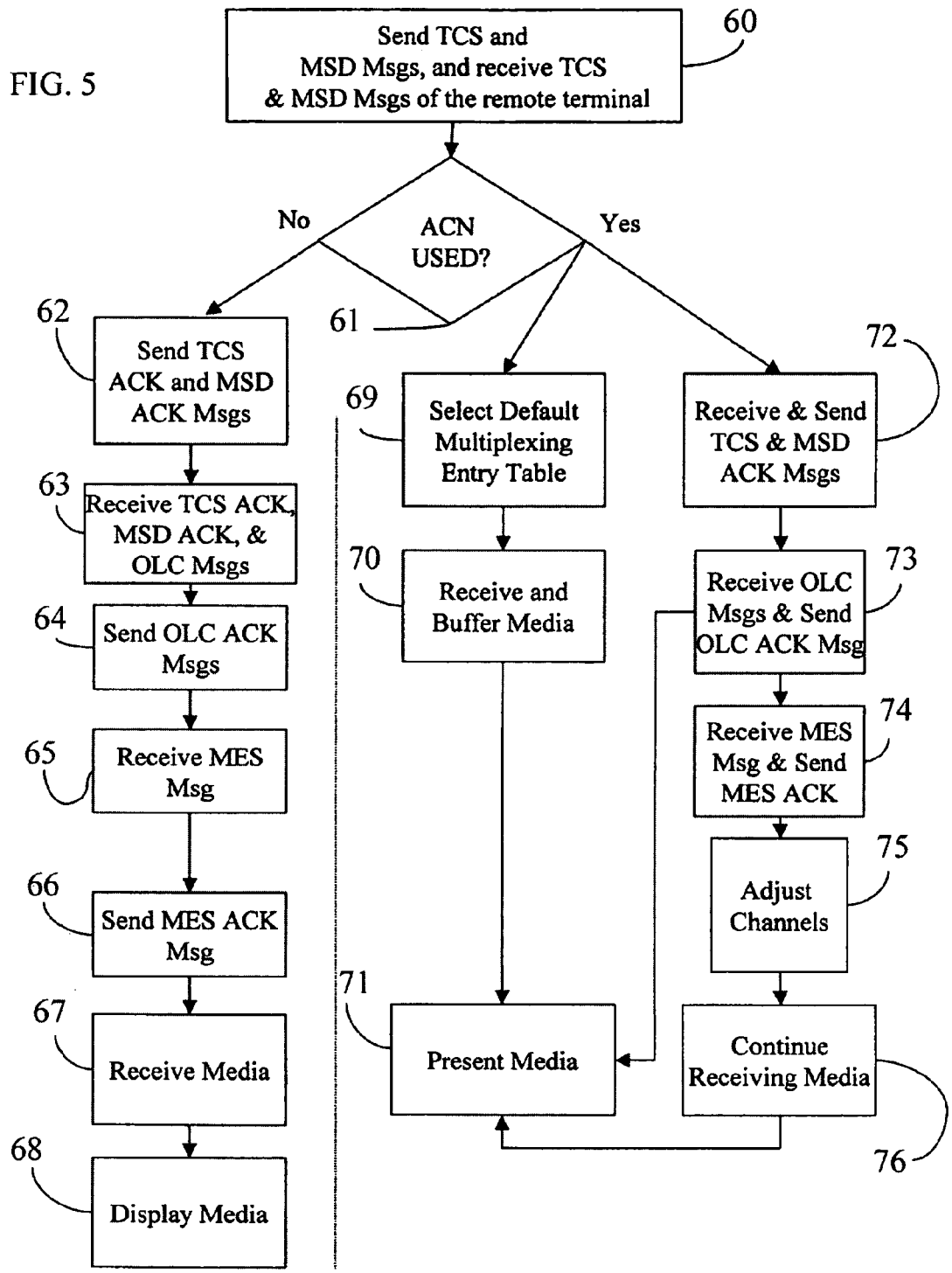
FIG. 5 is a diagram showing a method for receiving, at one terminal, media from another terminal in accordance with certain embodiments of the present invention.

FIG. 5 illustrates a method for terminal 11 to receive media transmitted from terminal 12. As before, either of terminals 11 or 12 may be a receiving terminal, which receives a call, and/or a sending terminal, which sends a call. Morever, either of terminals 11 and 12 may be a local terminal or a remote terminal. However, for convenience, FIG. 5 will be described with the assumption that terminal 11 acts as a local, receiving terminal (capable of ACN) and terminal 12 acts as a remote, sending terminal.

As shown, at step 60, terminal 12 may receive TCS (e.g., with an acnCapability parameter) and MSD messages from terminal 12. In response, terminal 11 may send TCS (e.g., with an acnCapability parameter) and MSD messages to terminal 12.

Next, at step 61, terminal 11 may determine whether ACN will be used. As described above, TCS message from terminal 12 may contain an acnCapability parameter indicating that terminal 12 is also capable of ACN. Alternatively, such a determination may be made in any other suitable manner.

If it is determined that ACN is not going to be used, then the method may proceed to step 62, where terminal 11 sends TCS Ack and MSD Ack messages to terminal 12. TCS Ack, MSD Ack, and OLC messages from terminal 12 may then be received by terminal 11 at step 63. Terminal 11 may send an OLC Ack message to terminal 12 at step 64. Next, terminal 11 may receive an MES message from terminal 12 at step 65 and MES Ack may be sent to terminal 12 from terminal 11 at step 66. Finally, media may be received at step 67 and presented at step 68. Routine receipt and presentation of media may take place after this point as is known in the art.

Returning to step 61, if it is determined that ACN is going to be used, then the method of the present invention may proceed to perform steps 69 through 76. As shown, steps 69 through 71 may be performed before or concurrently with steps 72 through 76.

At step 69, the method may select a default MUX entry table. For example, the default MUX entry table may be pre-programmed into terminals 11 and 12 or signaled within the TCS message. Next, at step 70, media from terminal 12 may be received and buffered by terminal 11. The media may then be presented to a user at step 71.

At step 72, TCS Ack and MSD Ack messages from terminal 12 may be received at terminal 11 and TCS Ack and MSD Ack messages may be sent from terminal 11 to terminal 12. At step 73, terminal 11 may receive OLC messages from terminal 12. After receiving an OLC message from terminal 12, terminal 11 may send an OLC Ack message to terminal 12, and the buffered media can be presented as shown in step 71. At step 74, terminal 11 may receive an MES message from terminal 12, and an MES Ack message may be sent from terminal 11 to terminal 12. If necessary, at step 75, the channel selections may be adjusted as indicated in the MES message. Finally, terminal 11 may continue to receive media at step 76 and may continue to present media to a user at step 71 as is known in the art.

It should noted that various modifications to the invention may be implemented without departing from the scope of the invention. For example, to open logical channels (see, e.g., steps 48, 49, 69, and 70), each terminal may select a set of preferred media types using local and remote capability sets defined above and by using the results of the master/slave determination process. For example, both the master and slave terminals, as determined by the master/slave determination mentioned above, may open unidirectional audio channels. Moreover, the slave terminal generally may not need to open any bidirectional channel using ACN.

Figure 6:
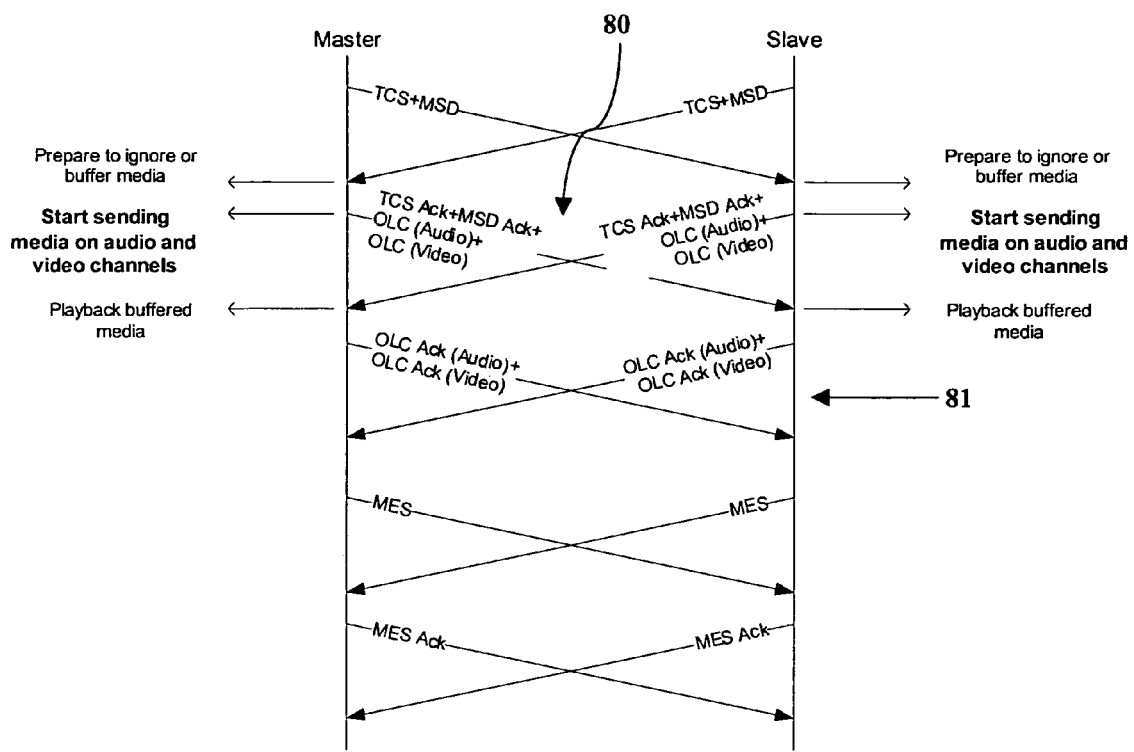
FIG. 6 is a diagram showing a method for sending and receiving media without bidirectional video support in accordance with certain embodiments of the present invention.

The master terminal may also open only a unidirectional video channel if it has not indicated that it will not open a bidirectional video channel using the masterBidirectionalVideo parameter defined in Table 4. FIG. 6 shows a diagram of a method for sending and receiving media without a bidirectional video preference in the master terminal. As illustrated, the method shown in FIG. 6 is generally similar to the method shown in FIG. 3, except FIG. 6 explicitly shows the OLC messages to contain OLC (Audio) and OLC (Video) (see step 80) and OLC Ack messages to contain OLC Ack (Audio) and OLC Ack (Video) messages (see step 81).

Figure 7:
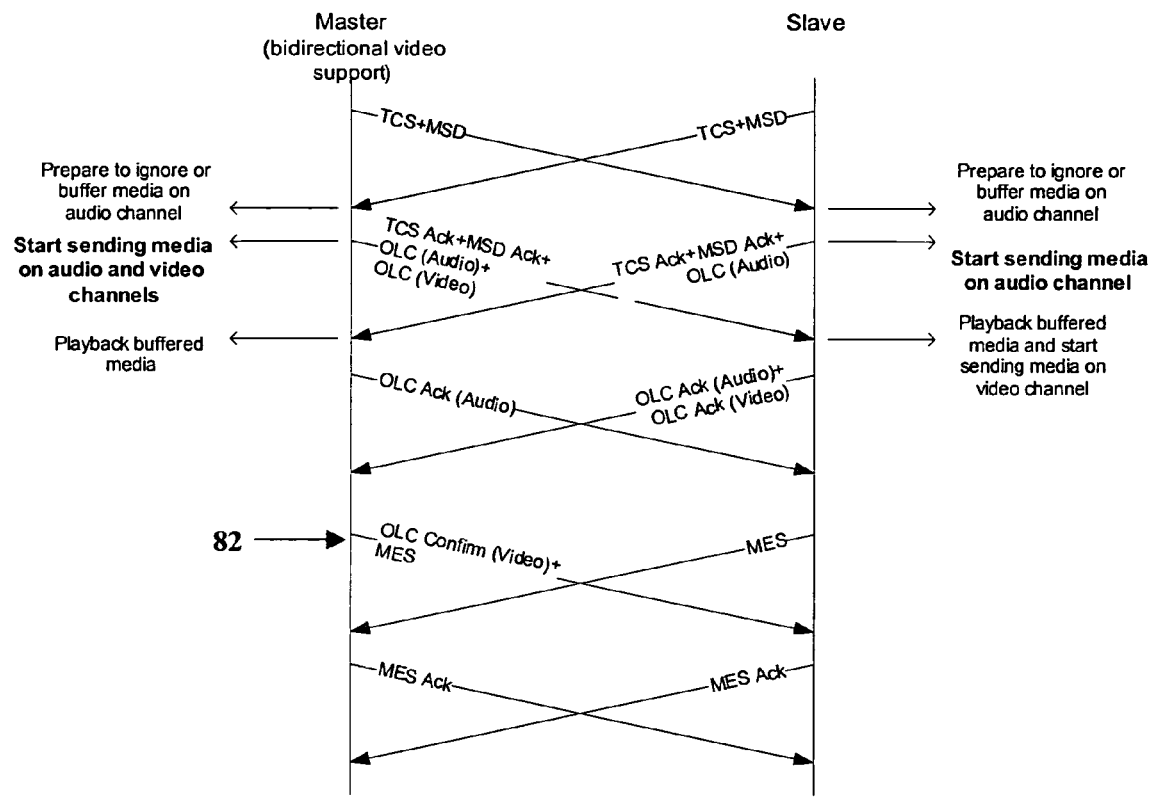
FIG. 7 is a diagram showing a method for sending and receiving media with bidirectional video support in accordance with certain embodiments of the present invention.

Alternatively, the master terminal may open a bidirectional video channel using ACN if it has specified the masterBidirectionalVideo parameter in the TCS message and if both the master and the slave terminals can use video with an adaptation layer that supports retransmissions (i.e., AL3, AL1M, or AL3M). FIG. 7 shows a diagram of a method for sending and receiving media with a bidirectional video preference in the master terminal. As shown, the steps carried out may be similar to that shown in FIG. 6, except that this method may require sending an OLC Confirm (Video) message (see step 82) along with the MES message from the master terminal to the slave terminal.

Figure 8:
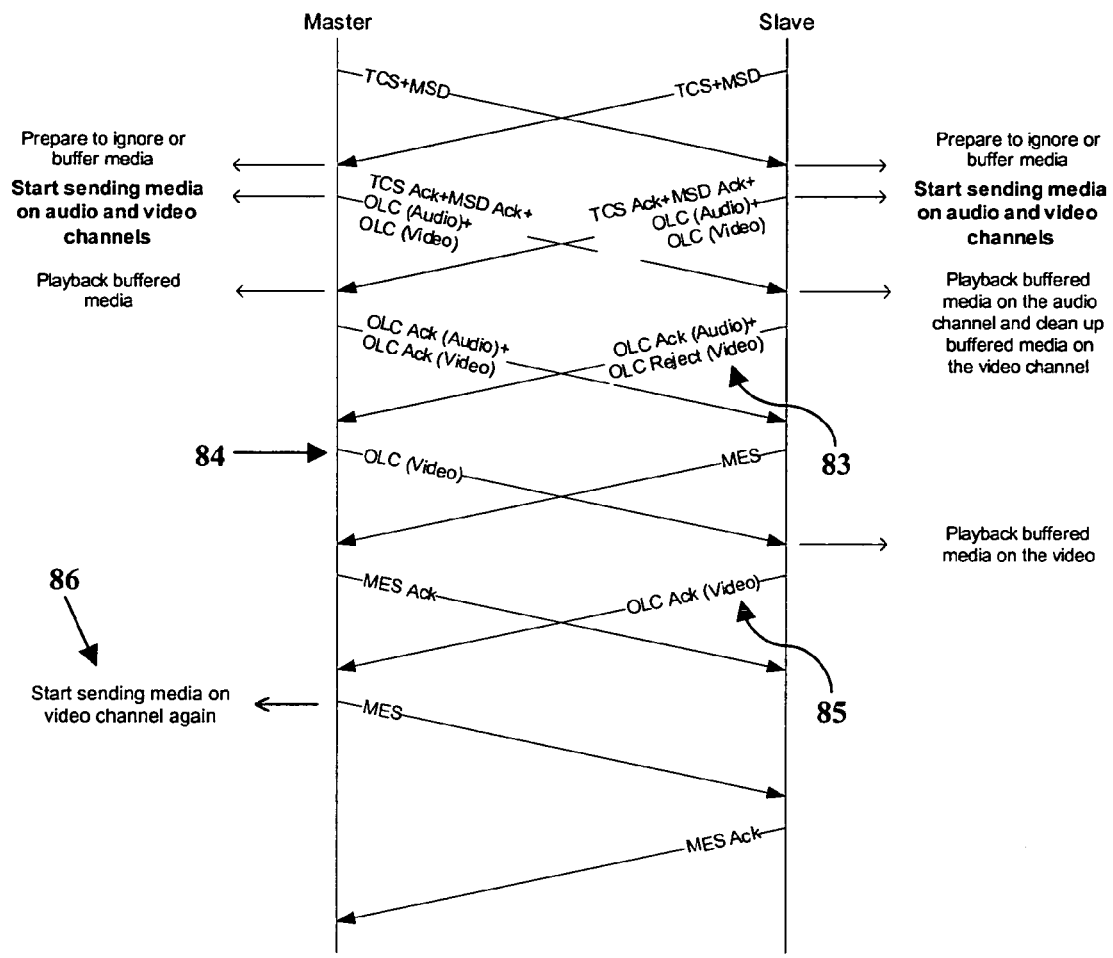
FIG. 8 is a diagram showing a method for sending and receiving media using ACN when one terminal rejects a proposed channel from another terminal in accordance with certain embodiments of the present invention.

In certain instances, a slave terminal may receive an OLC message from a master terminal and may reject the proposed channel, ignoring any media received for this channel. The slave terminal may also decide not to buffer any incoming media for this media type until a new OLC message is received for it from the master terminal. For example, FIG. 8 shows one embodiment of the invention where the video channel proposed by the master terminal is rejected by the slave terminal. The slave terminal may then send out a OpenLogicalChannelReject (OLC Reject) message for the video channel back to the master terminal (step 83).

The master terminal may then propose to open a different video channel using the regular OLC procedure or the ACN procedure (step 84). Then, the master terminal may receive an OLC Ack message from the slave terminal (step 85) and send media to the slave terminal again (step 86). Alternatively, the master terminal may decide to wait 2 seconds (measured from the time it last sent media on the rejected channel) (or any other appropriate amount of time) before resending the media to the slave terminal although an OLC Ack message has not been received.

In certain embodiments of the present invention, the methods described above may be embodied as a software product residing on a computer readable medium, such as a floppy disk, CD-ROM, DVD-ROM, hard disk, memory chip such as a programmable read-only-memory, erasable programmable read-only memory, electrically erasable programmable read-only memory, flash memory, random access memory, etc., or any other equivalents thereof. In particular, the products in accordance with the present invention may reside as a software in a device capable of 3G telephony, such as a mobile telephone, servers, terminals 11 and 12, or any other equivalents thereof.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. A method of reducing call setup times on a terminal, the method comprising:
    (a) selecting a default multiplexing entry table;
    (b) receiving media from a sending terminal on one or more logical channels;
    (c) optionally buffering the media received in step (b);
    (d) presenting the media;
    (e) receiving a TerminalCapabilitySetAck (TCS Ack) message from the sending terminal;

(f) receiving a MasterSlaveDeterminationAck (MSD Ack) message from the sending terminal; and (g) receiving at least one OpenLogicalChannel (OLC) message from the sending terminal, wherein the at least one OpenLogicalChannel (OLC) message is received from the sending terminal before receiving the TerminalCapabilitySetAck (TCS Ack) message and the MasterSlaveDeterminationAck (MSD Ack) message from the sending terminal;

wherein the media is received before receiving the at least one OpenLogicalChannel (OLC) message or a MultiplexEntrySend (MES) message from the sending terminal.

2. The method of claim 1, further comprising:

(h) sending a MultiplexEntrySendAck (MES Ack) message to the sending terminal;

wherein steps (a) through (c) are carried out before or concurrently with at least one of steps (e) through (h).

3. The method of claim 2, further comprising:

(i) adjusting the predetermined logical channels to one or more optimized logical channels based on the MultiplexEntrySend (MES) message and the MultiplexEntrySendAck (MES Ack) message;

wherein steps (a) through (c) are carried out before or concurrently with at least one of steps (e) through (i).

4. The method of claim 1, wherein step (d) is triggered to begin after step (g) is performed.

5. The method of claim 1, wherein step (d) is triggered to begin before step (g) is performed.

6. The method of claim 1, further comprising:
opening a unidirectional audio channel and a bidirectional video channel.

7. The method of claim 1, further comprising:
opening a unidirectional audio channel and a unidirectional video channel.

8. The method of claim 1, further comprising:
opening at least one media channels.

9. The method of claim 1, further comprising:
rejecting the predetermined logical channel; and
sending an acknowledgement message to the sending terminal in response to a message to open logical channels that are different from the predetermined logical channels.

10. A method of reducing call setup times on a terminal, the method comprising:

(a) selecting a default multiplexing entry table according to one or more signals comprised in one or more TerminalCapabilitySet (TCS) messages;

(b) sending a TerminalCapabilitySetAck (TCSAck) message to a receiving terminal;

(c) sending a MasterSlaveDeterminationAck (MSD Ack) message to the receiving terminal;

(d) sending at least one OpenLogicalChannel (OLC) message to the receiving terminal, wherein the at least one OpenLogicalChannel (OLC) message is sent to the receiving terminal before receiving the TerminalCapabilitySetAck (TCS Ack) message and the MasterSlaveDeterminationAck (MSD Ack) message from the receiving terminal;

(e) sending media to the receiving terminal on one or more logical channels opened with the at least one OpenLogicalChannel (OLC) message before receiving an OpenLogicalChannelAck (OLCAck) message from the receiving terminal; and (f) sending a MultiplexEntrySend request (MES) message to the receiving terminal.

11. The method of claim 10, wherein steps (a) through (e) are performed concurrently.

12. The method of claim 10, further comprising:
opening a unidirectional audio channel and a bidirectional video channel.

13. The method of claim 10, further comprising:
opening a unidirectional audio channel and a unidirectional video channel.

14. The method of claim 10, further comprising:
opening at least one media channels in accordance with the one or more signals comprised in the one or more TerminalCapabilitySet (TCS) messages.

15. The method of claim 10, further comprising:
sending another message to the receiving terminal to open one or more logical channels different from the predetermined logical channels.

16. A computer program product stored in a computer readable medium, the computer program product comprising instructions that, when executed by a sending terminal, cause the sending terminal to:

(a) select a default multiplexing entry table according to one or more signals comprised in one or more TerminalCapabilitySet (TCS) messages;

(b) send a TerminalCapabilitySetAck (TCS Ack) message to a receiving terminal;

(c) send a MasterSlaveDeterminationAck (MSD Ack) message to the receiving terminal;

(d) send at least one OpenLogicalChannel (OLC) message to the receiving terminal, wherein the at least one OpenLogicalChannel (OLC) message is sent to the receiving terminal before receiving the TerminalCapabilitySetAck (TCS Ack) message and the MasterSlaveDeterminationAck (MSD Ack) message from the receiving terminal;

(e) send media to the receiving terminal on one or more logical channels opened with the at least one OpenLogicalChannel (OLC) message before receiving an OpenLogicalChannelAck (OLC Ack) message from the receiving terminal; and (f) send a MultiplexEntrySend request (MES) message to the receiving terminal.

17. The computer program product of claim 16, wherein steps (a) through (e) are performed concurrently.

18. The computer program product of claim 16, further comprising instructions for causing the sending terminal to:
open a unidirectional audio channel and a bidirectional video channel.

19. The computer program product of claim 16, further comprising instructions for causing the sending terminal to:
open a unidirectional audio channel and a unidirectional video channel.

20. The computer program product of claim 16, further comprising instructions for causing the sending terminal to:
open at least one media channels.

21. The computer program product of claim 16, further comprising instructions for causing the sending terminal to:
send another message to the receiving terminal to open one or more logical channels different from the predetermined logical channels.

22. A computer program product stored in a computer readable medium, the computer program product comprising instructions that, when executed by a receiving terminal, cause the receiving terminal to:

(a) select a default multiplexing entry table;

(b) receive media from a sending terminal on one or more logical channels;

(c) optionally buffer the media received in step (b);

(d) present the media;
(e) receive a TerminalCapabilitySetAck (TCSAck) message from the sending terminal;
(f) receive a MasterSlaveDeterminationAck (MSDAck) message from the sending terminal; and
(g) receive at least one OpenLogicalChannel (OLC) message from the sending terminal, wherein the at least one OpenLogicalChannel (OLC) message is received from the sending terminal before receiving the TerminalCapabilitySetAck (TCSAck) message and the MasterSlaveDeterminationAck (MSDAck) message from the sending terminal;
wherein the media is received before receiving the at least one OpenLogicalChannel (OLC) message or a MultiplexEntrySend (MES) message from the sending terminal.

23. The computer program product of claim 22, further comprising instructions for causing the receiving terminal to:
(h) send a MultiplexEntrySendAck (MESAck) message to the sending terminal;
wherein instructions (a) through (c) are carried out before or concurrently with at least one of instructions (e) through (h).

24. The computer program product of claim 22, wherein instruction (d) is triggered to begin after instruction (g) is performed.

25. The computer program product of claim 22, further comprising instructions for causing the receiving terminal to:
open a unidirectional audio channel and a bidirectional video channel.

26. The computer program product of claim 22, further comprising instructions for causing the receiving terminal to:
open a unidirectional audio channel and a unidirectional video channel.

27. The computer program product of claim 22, further comprising instructions for causing the receiving terminal to:
open at least one media channels.

* * * * *